United States Patent
Nakazuru et al.

(10) Patent No.: US 10,379,293 B2
(45) Date of Patent: Aug. 13, 2019

(54) OPTICAL CONNECTOR, OPTICAL CONNECTOR SYSTEM, AND ACTIVE OPTICAL CABLE PROVIDED WITH SAME

(71) Applicant: KYOCERA CORPORATION, Kyoto (JP)

(72) Inventors: Kazumi Nakazuru, Yokohama (JP); Masatoshi Tsunoda, Machida (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/769,716

(22) PCT Filed: Aug. 23, 2016

(86) PCT No.: PCT/JP2016/003843
§ 371 (c)(1),
(2) Date: Apr. 19, 2018

(87) PCT Pub. No.: WO2017/072993
PCT Pub. Date: Apr. 5, 2017

(65) Prior Publication Data
US 2018/0314009 A1 Nov. 1, 2018

(30) Foreign Application Priority Data
Oct. 28, 2015 (JP) ................................ 2015-211821

(51) Int. Cl.
*G02B 6/30* (2006.01)
*G02B 6/32* (2006.01)
(Continued)

(52) U.S. Cl.
CPC ................ *G02B 6/30* (2013.01); *G02B 6/32* (2013.01); *G02B 6/3882* (2013.01);
(Continued)

(58) Field of Classification Search
CPC .......... G02B 6/30; G02B 6/32; G02B 6/3882; G02B 6/3885
(Continued)

(56) References Cited

U.S. PATENT DOCUMENTS 9,250,397 B2 * 2/2016 Akabane .............. G02B 6/3874
9,651,750 B2 5/2017 Moriyama et al.
(Continued)

FOREIGN PATENT DOCUMENTS

CN 103076660 A 5/2013
JP 59-116707 A 7/1984
(Continued)

OTHER PUBLICATIONS

International Search Report dated Nov. 22, 2016, in corresponding Japanese Patent Application No. PCT/JP2016/003843.

*Primary Examiner* — Robert Tavlykaev
(74) *Attorney, Agent, or Firm* — Duane Morris LLP (57) ABSTRACT

An optical connector, optical connector system, and active optical cable provided with these suffer little effect from scratches on the end face of an optical waveguide or from foreign material (dust) adhering to the end face, are manufacturable easily at low-cost, and moreover can send/receive optical signals efficiently between the end faces of the optical waveguide and an optical fiber. An optical connector (30) includes a connector body (30) provided between and connecting a substrate (10) faced by an optical input/output end face (11t) of an optical waveguide (11) and a ferrule (20) faced by an optical input/output end face (23t) of an optical fiber (23), and a lens portion (36) provided in the connector body (30) between the end face (11t) of the optical waveguide (11) and the end face (23t) of the optical fiber (23) and configured to send/receive an optical signal between the end faces (11t, 23t).

8 Claims, 7 Drawing Sheets

(51) Int. Cl.
*G02B 6/38* (2006.01)
*G02B 6/36* (2006.01)
*G02B 6/42* (2006.01)
*G02B 6/12* (2006.01)
*G02B 6/122* (2006.01)

(52) U.S. Cl.
CPC .............. *G02B 6/3885* (2013.01); *G02B 6/12* (2013.01); *G02B 6/122* (2013.01); *G02B 6/36* (2013.01); *G02B 6/3853* (2013.01); *G02B 6/3897* (2013.01); *G02B 6/42* (2013.01); *G02B 6/4214* (2013.01)

(58) Field of Classification Search
USPC ........................................ 385/38, 49, 88, 89
See application file for complete search history.

(56) References Cited

U.S. PATENT DOCUMENTS

| | | | | |
|---|---|---|---|---|
| 9,946,033 | B2* | 4/2018 | Elliott | G02B 6/3861 |
| 2006/0245694 | A1* | 11/2006 | Chen | G02B 6/32 385/71 |
| 2010/0215312 | A1* | 8/2010 | Daikuhara | G02B 6/4204 385/14 |
| 2013/0129280 | A1 | 5/2013 | Lin | |
| 2014/0270626 | A1* | 9/2014 | Isenhour | G02B 6/122 385/14 |
| 2014/0301700 | A1* | 10/2014 | Matsubara | G02B 6/30 385/54 |
| 2015/0023636 | A1 | 1/2015 | Moriyama et al. | |
| 2015/0370017 | A1* | 12/2015 | Moriyama | G02B 6/322 385/78 |
| 2018/0059331 | A1* | 3/2018 | Evans | G02B 6/30 |

FOREIGN PATENT DOCUMENTS

| | | |
|---|---|---|
| JP | H6-300939 A | 10/1994 |
| JP | 2000-304966 A | 11/2000 |
| JP | 2013-29624 A | 2/2013 |
| JP | 2015-22130 A | 2/2015 |
| TW | 201321812 A1 | 6/2013 |

* cited by examiner

OPTICAL CONNECTOR, OPTICAL CONNECTOR SYSTEM, AND ACTIVE OPTICAL CABLE PROVIDED WITH SAME

CROSS-REFERENCE TO RELATED APPLICATION

The present application claims priority to and the benefit of Japanese Patent Application No. 2015-211821 filed Oct. 28, 2015, the entire contents of which are incorporated herein by reference.

TECHNICAL FIELD

The present disclosure relates to an optical connector, an optical connector system including the optical connector, and an active optical cable provided with these, for sending and receiving optical signals between an optical input/output end face (hereinafter simply "end face") of an optical waveguide disposed on a substrate having an optical element (optical emitting element or optical detecting element) and an optical input/output end face of an optical fiber.

BACKGROUND

In the technical field of high-speed, high-capacity data optical communication at 25 Gbps/ch or higher, for example, an optical connector is used to transmit and receive optical signals between an end face of an optical waveguide disposed on a substrate having an optical element and an end face of an optical fiber.

In this type of optical connector, the optical element and the optical waveguide are formed on the substrate with a thin film technique. The end face of the optical waveguide is exposed to the end face of the substrate by dicing. The end face of the optical fiber is aligned with and abutted against the end face of the optical waveguide. That is, the optical element is coupled with the optical waveguide via a mirror or the like that is formed on the optical waveguide and allows optical path conversion (such as reflection means, i.e. optical path conversion means, utilizing vapor deposition or a difference in refractive index). The optical waveguide is further coupled with the optical fiber. It thus becomes essential to perform connected coupling that involves aligning the optical axis twice with the optical waveguide as a reference.

CITATION LIST

Patent Literature

PTL 1: JP H6-300939 A

SUMMARY

Technical Problem

Such an optical connector, however, has the problem of easily being affected by scratches on the end faces of multiple optical waveguides that are exposed in a row at the end face of the substrate, or by foreign matter (dust) adhering to the end faces. Furthermore, strict alignment (tolerance) between the end face of the optical waveguide and the end face of the optical fiber is required, leading to problems such as difficulty in manufacturing and increased costs. In particular, the end face of the optical fiber needs to be subjected to PC polishing (convex polishing) and abutted against the end face of the optical waveguide with high precision to send and receive optical signals efficiently. The problems of difficulty in manufacturing and increased costs thereby become more significant.

The present disclosure is based on an awareness of the above problems, and is an object thereof to provide an optical connector, an optical connector system, and an active optical cable provided with these, that suffer little effect from scratches on the end face of an optical waveguide or from foreign material (dust) adhering to the end face, that can be manufactured easily at low-cost, and moreover that can send and receive optical signals efficiently between the end face of the optical waveguide and the end face of an optical fiber.

Solution to Problem

An optical connector of the present disclosure comprises: a connector body provided between and connecting a substrate faced by an optical input/output end face of an optical waveguide and a ferrule faced by an optical input/output end face of an optical fiber; and a lens portion provided in the connector body at a position between the optical input/output end face of the optical waveguide and the optical input/output end face of the optical fiber and configured to send and receive an optical signal between the optical input/output end faces.

The connector body may comprise an intervening wall made of a translucent material at a position between the substrate and the ferrule, and the lens portion may be formed integrally with the intervening wall.

The lens portion may comprise an optical waveguide-side lens facing the optical input/output end face of the optical waveguide and an optical fiber-side lens facing the optical input/output end face of the optical fiber, and in accordance with a traveling direction of an optical signal, one of the optical waveguide-side lens and the optical fiber-side lens may act as a collimator lens and the other may act as a condensing lens.

A guide may be formed, between the connector body and the substrate and be configured to guide the connector body and the substrate to allow relative movement of the connector body and the substrate in a direction parallel to an extending direction of the optical waveguide.

An optical connector system of the present disclosure comprises: a substrate comprising an optical element; a plurality of optical waveguides provided on the substrate so as to form an optical path continuing to the optical element, with optical input/output faces of the optical waveguides facing an end face of the substrate; a ferrule holding a plurality of optical fibers comprising optical input/output end faces configured to send and receive an optical signal to and from the optical input/output end faces of the plurality of optical waveguides; a receptacle comprising an intervening wall at a position between the substrate and the ferrule; and a plurality of lens portions provided on the intervening wall of the receptacle at positions between, and in a non-contact manner relative to, the optical input/output end faces of the plurality of optical waveguides and the optical input/output end faces of the plurality of optical fibers and configured to send and receive an optical signal between the optical input/output end faces of the plurality of optical waveguides and the optical input/output end faces of the plurality of optical fibers.

At least the intervening wall of the receptacle may be made of a translucent material, and the lens portions may be formed integrally with the intervening wall.

The lens portions may each comprise an optical waveguide-side lens facing the optical input/output end faces of the optical waveguides and an optical fiber-side lens facing the optical input/output end faces of the optical fibers, and in accordance with a traveling direction of an optical signal, one of the optical waveguide-side lens and the optical fiber-side lens may act as a collimator lens and the other may act as a condensing lens.

A guide may be formed between the receptacle and the substrate and be configured to guide the receptacle and the substrate to allow relative movement of the receptacle and the substrate in a direction parallel to an extending direction of the optical waveguide.

An active optical cable of the present disclosure comprises any one of the above-described optical connectors or optical connector systems.

Advantageous Effect

According to the present disclosure, it is possible to obtain an optical connector, an optical connector system, and an active optical cable provided with these, that suffer little effect from scratches on the end face of an optical waveguide or from foreign material (dust) adhering to the end face, that can be manufactured easily at low-cost, and moreover that can send and receive optical signals efficiently between the end face of the optical waveguide and the end face of an optical fiber.

DETAILED DESCRIPTION

Figure 1:
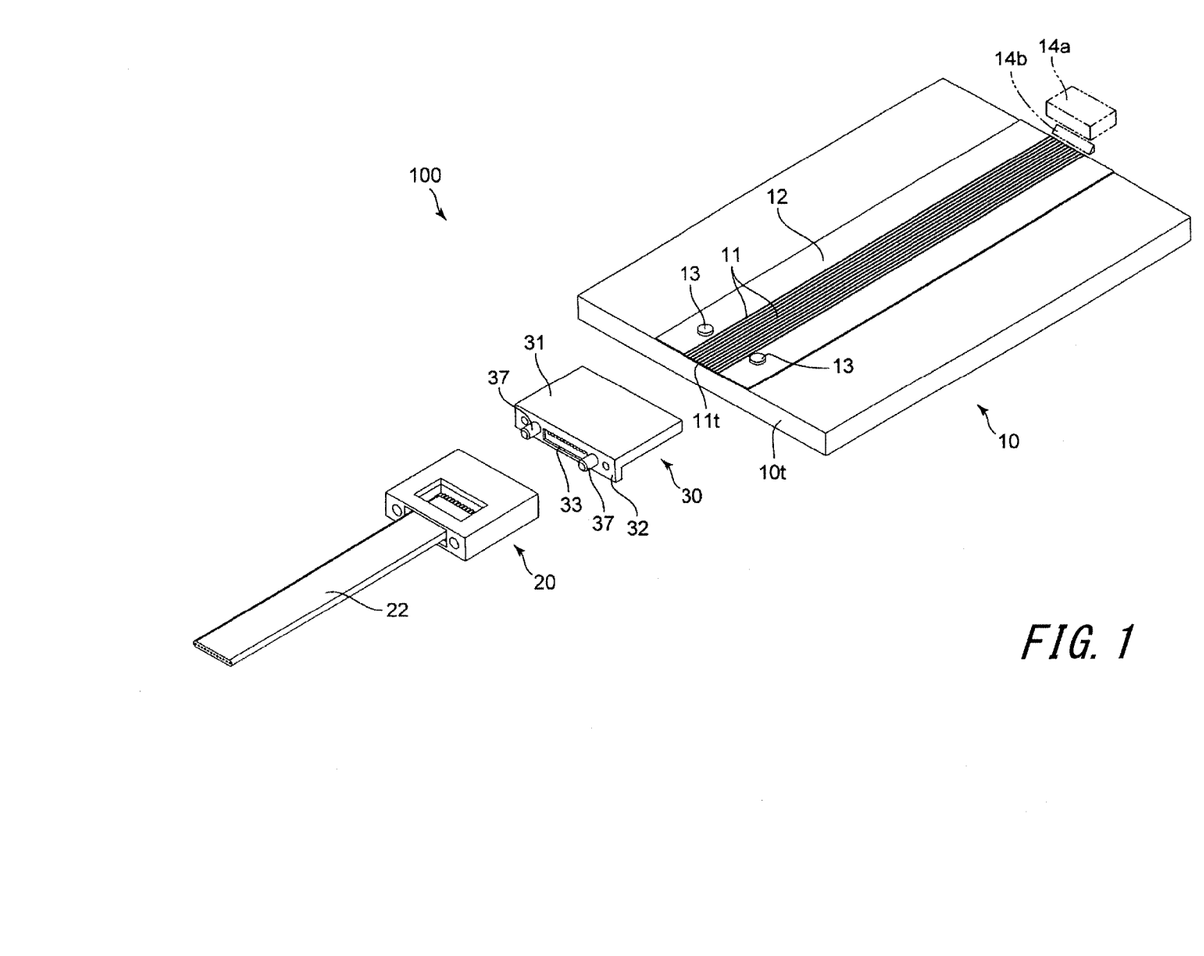
FIG. 1 is a perspective view, illustrating an embodiment of an optical connector system according to the present disclosure, of a substrate, a ferrule, and an optical connector in a disassembled state.
Figure 2:
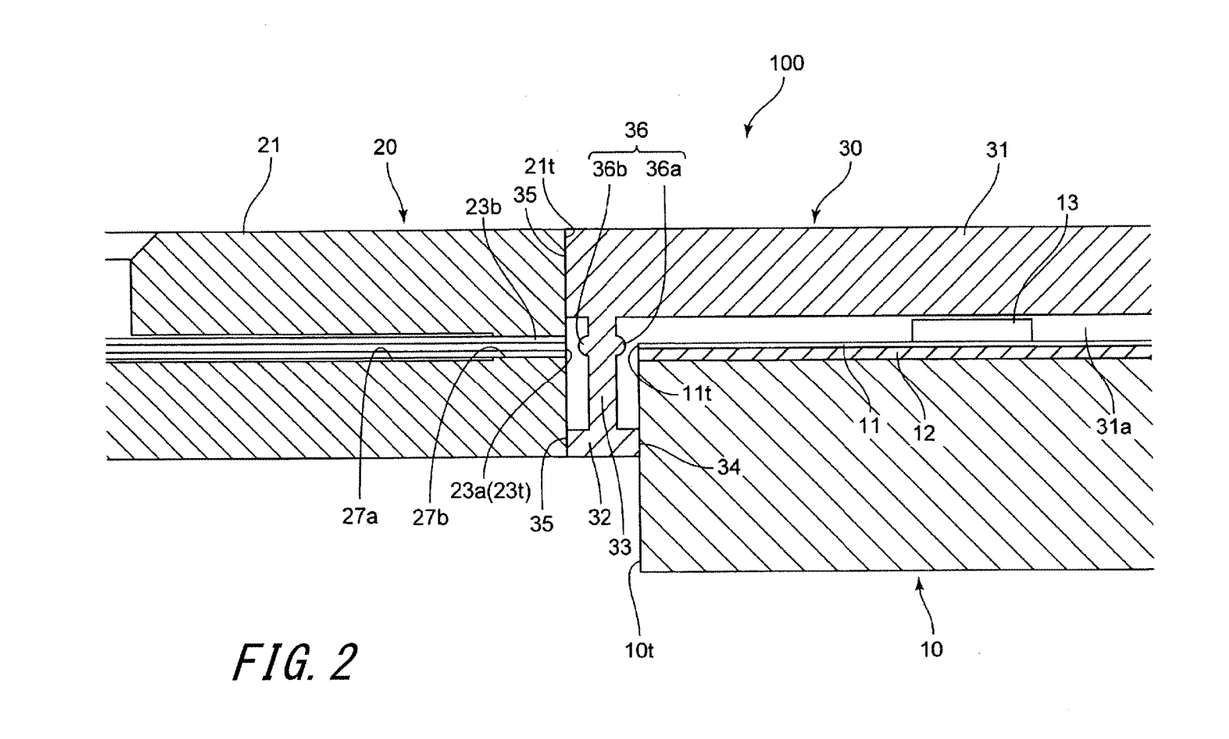
FIG. 2 is a cross-section of the connected state in FIG. 1.
Figure 3:
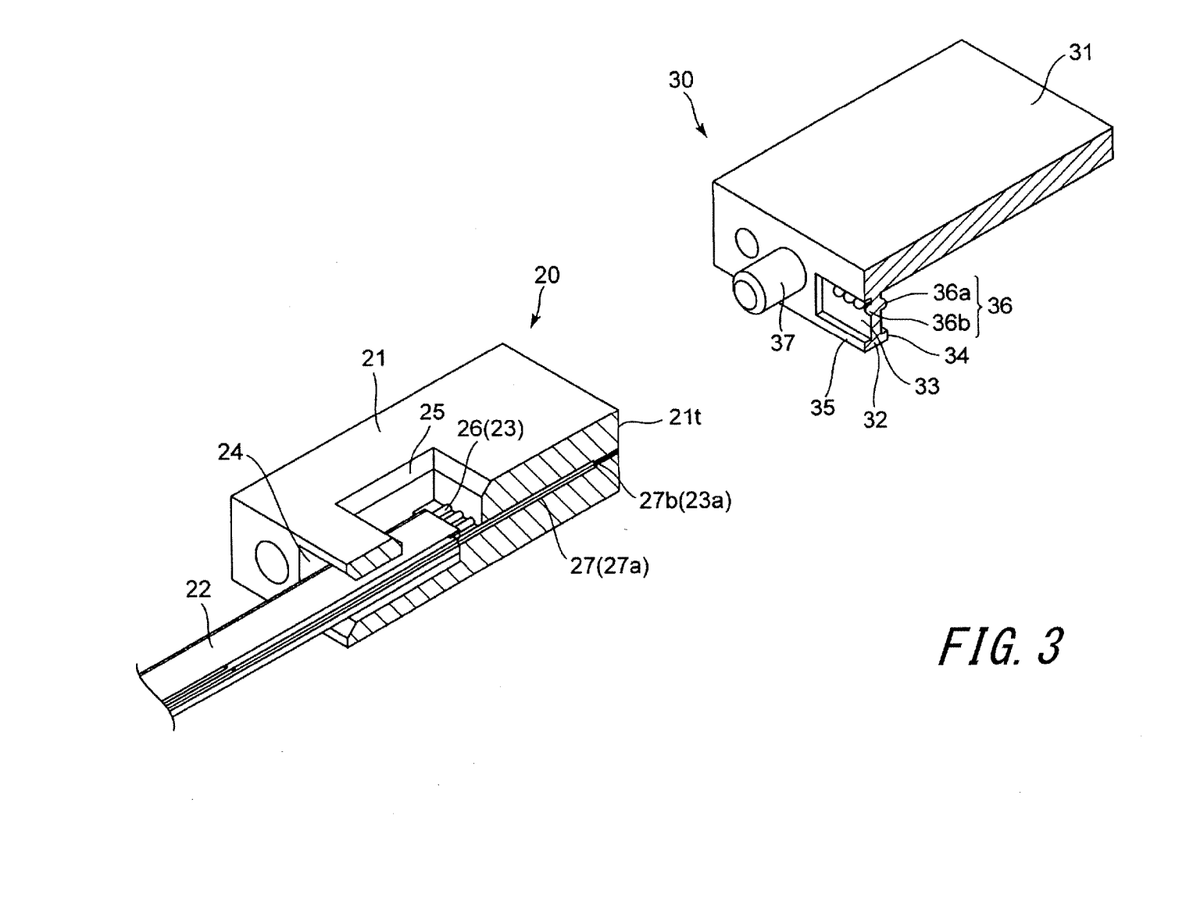
FIG. 3 is a partial cross-section of the ferrule and optical connector in a disassembled state.
Figure 4:
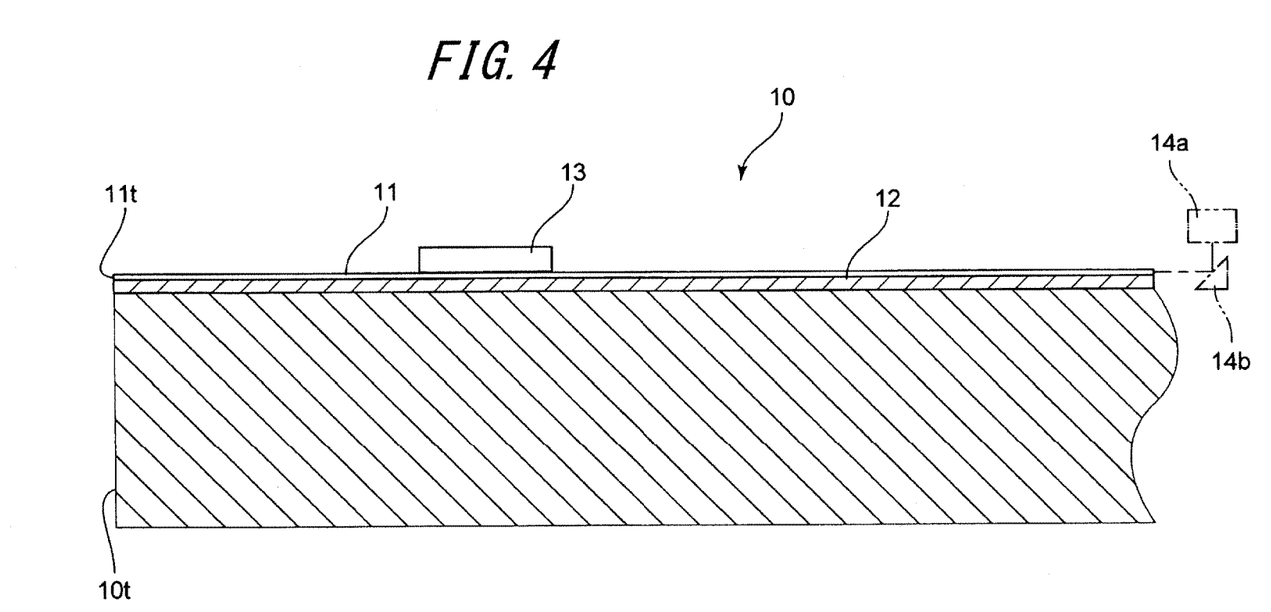
FIG. 4 is a cross-section of the substrate alone.
Figure 7:
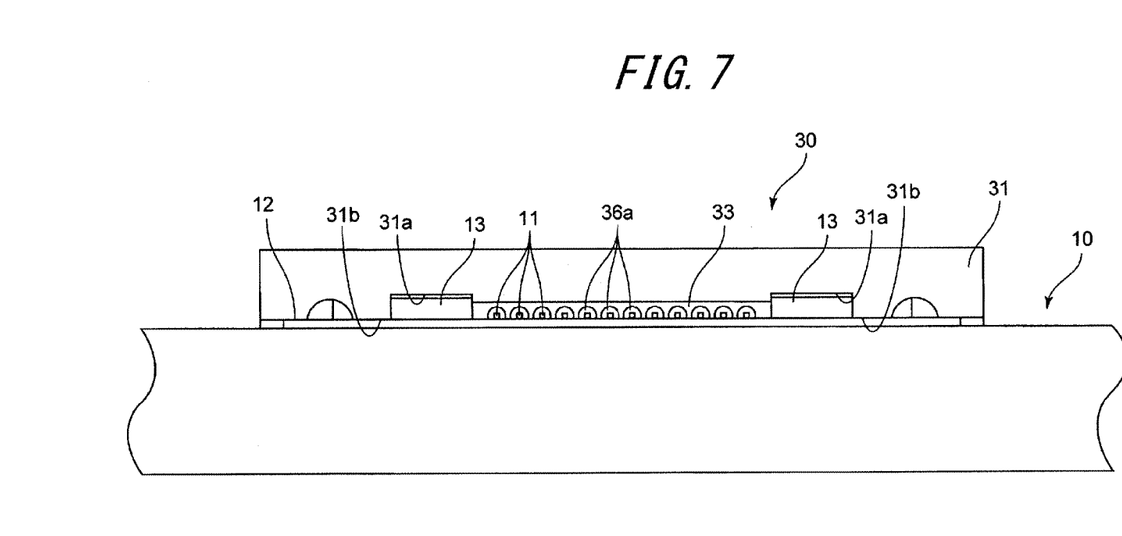
FIG. 7 illustrates the connecting condition of the optical connector system from the substrate side.

FIG. 1 through FIG. 3 illustrate an embodiment of an optical connector system 100 according to the present disclosure. This optical connector system 100 can be applied to an active optical cable (AOC) that implements high-speed, high-capacity data optical communication (for example, 25 Gbps/ch or higher) over long distances. The main components of the optical connector system 100 are a substrate (a wiring substrate that is an organic substrate or a ceramic substrate) 10, a ferrule 20, and an optical connector (connector body, receptacle, plug) 30. Multiple (12 in the illustrated example) optical waveguides 11 are formed on the substrate 10 (illustrated alone in FIG. 4), with a substrate layer 12 therebetween, by a known thin film technique and photolithography technique. An optical emitting element (for example, a vertical cavity surface emitting laser, or VCSEL) 14a and a mirror 14b are formed as a photoelectric conversion element that causes an optical signal to be incident on each of the optical waveguides 11. The optical waveguides 11 are formed to be orthogonal to the end face 10t of the substrate 10. The optical input/output end faces (hereinafter simply "end faces") 11t of the optical waveguides 11 are exposed by dicing the end face 10t. In FIGS. 2, 4, and 7, only the optical waveguide 11 alone (independently) is illustrated, but a known cladding is formed around the optical waveguide 11. On the substrate 10 (substrate layer 12), a projecting pair of guide projections 13 for coupling with the optical connector 30 is formed at both sides in the direction in which the multiple optical waveguides 11 are lined up.

Figure 5:
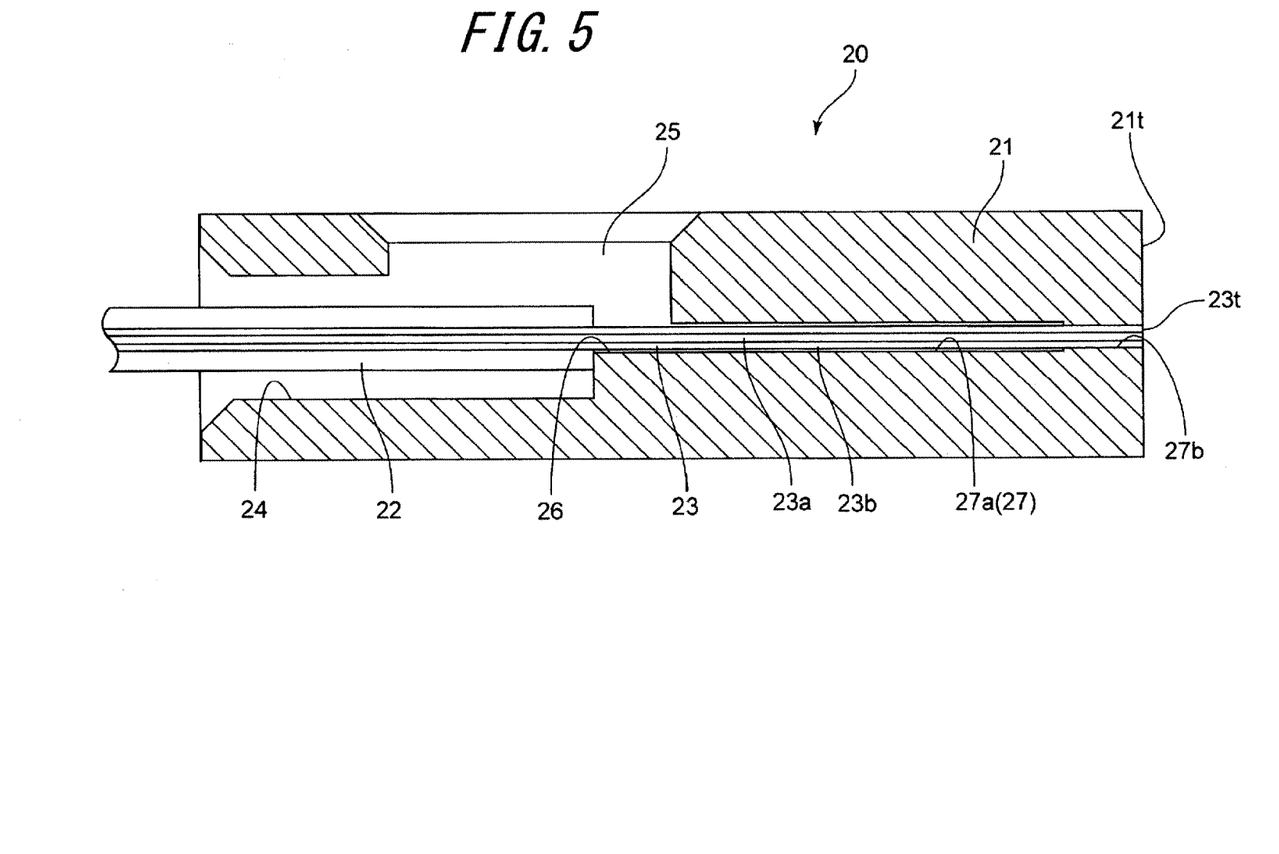
FIG. 5 is a cross-section of the ferrule alone.

The ferrule 20 (illustrated alone in FIG. 5) guides 12 optical fibers 23 inside a multi-mode fiber 22 in a synthetic resin body 21 of the ferrule 20. A guide opening 24, an operation opening 25, 12 semicircular holding grooves 26 facing the operation opening 25, and 12 fiber guide holes 27 connecting to the holding grooves 26 are formed in the body 21. The fiber guide hole 27 has a large diameter portion 27a opening to the operation opening 25 and a small diameter portion 27b connecting to the large diameter portion 27a. The tip of the small diameter portion 27b opens to an end face 21t of the body 21. The reason for forming the fiber guide hole 27 with the large diameter portion 27a and the small diameter portion 27b is to facilitate insertion of the optical fiber 23 with the large diameter portion 27a and to determine the position of the optical fiber 23 (core 23a) accurately with the small diameter portion 27b. The 12 optical fibers 23 are led from the guide opening 24 onto the corresponding holding grooves 26 in the operation opening 25 and are inserted into the fiber guide hole 27. As is well known, the optical fiber 23 is formed by a central core 23a and a peripheral cladding 23b. Optical input/output end faces (hereinafter simply "end faces") 23t of the cores 23a (optical fibers 23) projecting from the end face 21t of the body 21 are flat polished to be coplanar with the end face 21t in the optical plane.

The optical connector 30 (illustrated alone in FIG. 6) optically connects the aforementioned end faces 11t of the optical waveguides 11 of the substrate 10 and the end faces 23t of the cores 23a of the optical fibers 23 of the ferrule 20 without physical contact. The optical connector 30 is formed from a translucent material (for example, a translucent synthetic resin such as polyetherimide). The optical connector 30 has an upper surface wall 31 that conforms to the surface on which the optical waveguides 11 of the substrate 10 are formed and an end face wall 32 formed to be orthogonal to the upper surface wall 31 at the end of the upper surface wall 31 on the ferrule 20 side thereof. The upper surface wall 31 has a positioning surface 31b that comes in contact with the upper surface of the substrate 10 (substrate layer 12). A guide recess 31a that engages with the guide projections 13 of the substrate 10 and guides the sliding (moving) direction of the optical connector 30 relative to the substrate 10 is formed on the positioning surface 31b. The guide projections 13 and the guide recess 31a constitute a guide that guides the substrate 10 and the optical connector 30 to allow relative movement thereof in a direction parallel to the extending direction of the optical waveguides 11. The positioning surface 31b and the upper surface of the substrate 10 (substrate layer 12) constitute the positioning surfaces of the optical connector 30 and the substrate 10 in a direction orthogonal to the direction in which the optical waveguides 11 are lined up.

Figure 6:
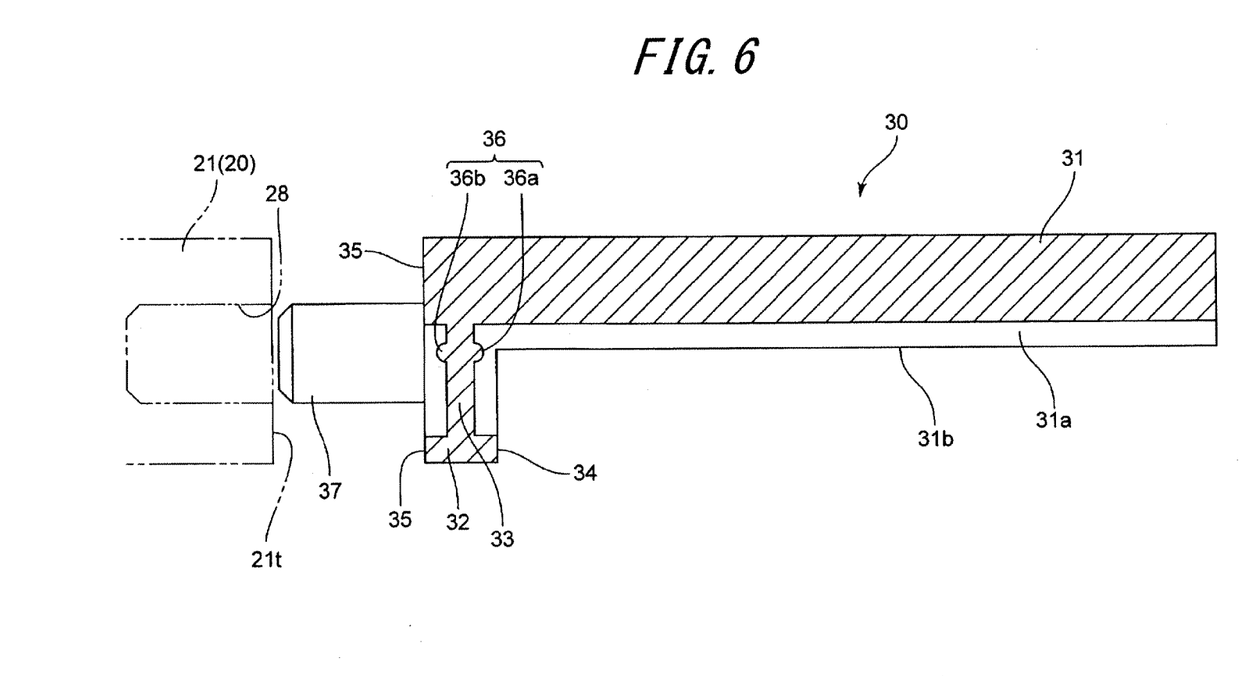
FIG. 6 is a cross-section of the optical connector alone.

A non-contact intervening wall 33 that is thinner than the end face wall 32 is formed in the central portion of the end face wall 32 of the optical connector 30 by recessing the substrate 10 side and ferrule 20 side of the end face wall 32. The end face positioned at both sides and at the bottom of the non-contact intervening wall 33 of the end face wall 32 constitutes a positioning surface (wall) 34 that abuts the end face 11t of the substrate 10 and determines the interval between the end face 11t and the non-contact intervening wall 33. The end face of the end face wall 32, excluding the non-contact intervening wall 33, on the ferrule 20 side constitutes a positioning surface (wall) 35 that abuts the end face 21t of the body 21 and determines the interval between the end face 21t and the non-contact intervening wall 33. The positioning surface 34 and the positioning surface 35 of the non-contact intervening wall 33 are parallel to each other, and the ferrule 20 (end face 21t) and the substrate 10 (end face 10t) are not in contact.

On the non-contact intervening wall 33 of the optical connector 30, lens portions 36 are formed integrally at a position between the end faces 11t of the optical waveguides 11 and the end faces 23t of the cores 23a of the optical fibers 23. The lens portions 36 are formed by collimator lenses (optical waveguide-side lenses) 36a that, without being in contact with the end faces 11t of the optical waveguides 11, collimate beams (signal light) emitted from the end faces 11t into substantially parallel light and condensing lenses (optical fiber-side lenses) 36b that condense the beams formed as substantially parallel light by the collimator lenses 36a towards the cores 23a of the optical fibers 23 without being in contact with the cores 23a (end faces 23t).

The distance between the collimator lenses 36a of the lens portions 36 of the optical connector 30 and the end faces 11t of the optical waveguides 11 and the distance between the condensing lenses 36b of the lens portions 36 of the optical connector 30 and the end faces 23t of the cores 23a of the optical fibers 23 have a degree of freedom. The size, amount of projection, or curvature (radius) of either or both of the collimator lenses 36a and the condensing lenses 36b of the lens portions 36 of the optical connector 30 can be changed (set) in accordance with these distances.

Either or both of the collimator lenses 36a and the condensing lenses 36b of the lens portions 36 of the optical connector 30 may have an aspherical shape. In this way, the light-collecting factor of each lens can be further improved, and positioning can be further facilitated.

A positioning pin 37 formed to project from the optical connector 30 towards the ferrule 20 and a positioning hole 28 formed in the ferrule 20 for receiving the positioning pin 37 may be formed between the optical connector 30 and the ferrule 20 (see FIG. 6) as positioning means of the optical connector 30 and the ferrule 20.

In the optical connector system 100 with the aforementioned configuration, the optical connector 30 is used by being provided between the substrate 10 formed in advance and the ferrule 20 formed in advance. In other words, the positions of the guide projections 13 of the substrate 10 and the guide recess 31a of the optical connector 30 are matched, the substrate 10 and the optical connector 30 are brought closer together, and the end faces 10t of the substrate 10 and the positioning surface 34 of the optical connector 30 are abutted. The positioning pin 37 of the optical connector 30 is fit in the positioning hole 28 of the ferrule 20 and both are brought closer together to abut the positioning surface 35 of the optical connector 30 against the end face 21t of the ferrule 20.

In this state, when an optical signal is emitted from the optical emitting element 14a of the substrate 10, the beams are guided by the optical waveguides 11 and reach the end faces 11t. The beams that have reached the end faces 11t are diffused and emitted from the end faces 11t, and the diffused emission light is collimated into substantially parallel light by the collimator lenses 36a of the optical connector 30. This substantially parallel light passes through the non-contact intervening wall 33 to reach the condensing lenses 36b, is condensed by the condensing lenses 36b, and reaches the end faces 23t of the cores 23a of the optical fibers 23. The beams enter the cores 23a of the optical fibers 23, propagate in the cores 23a, and reach the optical detecting element provided at the other end of the optical fibers 23, thereby achieving optical communication.

In this way, without physical contact between (the optical input/output end faces 11t of) the optical waveguides 11 and (the optical input/output end faces 23t of) the optical fibers 23, the present embodiment can achieve optical communication between the optical waveguides 11 and the optical fibers 23. Therefore, the effect of scratches on the end faces 11t of the optical waveguides 11 or of foreign material (dust) adhering to the end faces 11t is small. Furthermore, simple flat polishing of the end faces 11t of the optical waveguides 11 and the end faces 23t of the optical fibers 23 is sufficient (PC polishing, i.e. convex polishing, is unnecessary), facilitating production without incurring high polishing costs.

The above embodiment is for transmitting an optical signal from the side of the optical waveguides 11 of the substrate 10 to the side of the multi-mode fiber 22 of the ferrule 20. The present disclosure, however, may also be applied in reverse to an embodiment for transmitting an optical signal from the side of the multi-mode fiber 22 of the ferrule 20 to the side of the optical waveguides 11 of the substrate 10. In such an embodiment, an optical detecting element for detecting an optical signal from the optical waveguides 11 is provided on the substrate 10, and an optical emitting element is provided at the non-illustrated end of the multi-mode fiber 22 of the ferrule 20. In this embodiment, the optical fiber-side lenses 36b function as collimator lenses that collimate beams from the cores 23a into substantially parallel light, and the optical waveguide-side lenses 36a function as condensing lenses that condense the beams that were collimated into substantially parallel light by the optical fiber-side lenses 36b towards the end faces 11t.

In the present embodiment, the number of optical fibers 23 of the multi-mode fiber 22 and of optical waveguides 11 has been described as being 12. The number 12 is only an example, however, and the number of optical fibers 23 and optical waveguides 11 is not limited to 12.

REFERENCE SIGNS LIST

10 Substrate (organic substrate, ceramic substrate, wiring substrate)
10t End face
11 Optical waveguide
11t Optical input/output end face (end face)
12 Substrate layer
13 Guide projections (guides)
14a Optical emitting element (photoelectric conversion element)
14b Mirror
20 Ferrule
21 Body (synthetic resin body)
21t End face
22 Multi-mode fiber
23 Optical fiber
23a Core
23b Cladding
23t Optical input/output end face (end face)
24 Guide opening
25 Operating opening
26 Holding groove
27 Fiber guide hole
27a Large diameter portion
27b Small diameter portion 28 Positioning hole
30 Optical connector (connector body, receptacle, plug)
31 Upper surface wall
31a Guide recess (guide)
31b Positioning surface
32 End face wall
33 Non-contact intervening wall (intervening wall)
34 Positioning surface (wall)
35 Positioning surface (wall)
36 Lens portion
36a Optical waveguide-side lens (collimator lens or condensing lens)
36b Optical fiber-side lens (condensing lens or collimator lens)
37 Positioning pin
100 Optical connector system (active optical cable)

The invention claimed is:

1. An optical connector comprising:
a connector body provided between and connecting a substrate on which an optical input/output end face of an optical waveguide is formed and a ferrule into which an optical input/output end face of an optical fiber is inserted, wherein the connector body is L-shaped and includes an upper surface wall that conforms to a substrate layer of said substrate, an end face wall formed to be orthogonal to said upper surface wall at an end of said upper surface wall on said ferrule side, and an intervening wall formed to said end face wall and made of a translucent material at a position between said optical input/output end face of said optical waveguide and said optical input/output end face of said optical fiber; and
an optical waveguide-side lens facing said optical input/output end face of said optical waveguide and an optical fiber-side lens facing said optical input/output end face of said optical fiber, formed integrally with said intervening wall, provided at a position between said optical input/output end face of said optical waveguide and said optical input/output end face of said optical fiber and configured to send and receive an optical signal between said optical input/output end faces,
wherein said end face wall comprises a first end face facing an end face of said substrate in an optical transmission direction and positioned closer to said substrate than said optical waveguide-side lens, and a second end face facing said ferrule in said optical transmission direction and positioned closer to said ferrule than said optical fiber-side lens; and
wherein a positioning surface that comes in contact with said substrate layer is formed on said upper surface wall of said connector body.

2. The optical connector of claim 1, wherein in accordance with a traveling direction of an optical signal, one of said optical waveguide-side lens and said optical fiber-side lens acts as a collimator lens and the other acts as a condensing lens.

3. The optical connector of claim 1, wherein a guide is formed between said connector body and said substrate and is configured to guide said connector body and said substrate to allow relative movement of said connector body and said substrate in a direction parallel to an extending direction of said optical waveguide.

4. An active optical cable comprising the optical connector of claim 1.

5. An optical connector system comprising:
a substrate comprising an optical element;
a plurality of optical waveguides provided on said substrate so as to form an optical path continuing to said optical element, with optical input/output end faces of said optical waveguides formed on an end face of said substrate;
a ferrule holding a plurality of optical fibers comprising optical input/output end faces configured to send and receive an optical signal to and from said optical input/output end faces of said plurality of optical waveguides;
a receptacle being L-shaped and comprising an upper surface wall that conforms to a substrate layer of said substrate, an end face wall formed to be orthogonal to said upper surface wall at an end of said upper surface wall on said ferrule side, and an intervening wall extending between said upper surface wall and said end face wall and made of a translucent material at a position between said optical input/output end faces of said optical waveguides and said optical input/output end faces of said optical fibers; and
a plurality of optical waveguide-side lenses facing said optical input/output end faces of said plurality of optical waveguides and a plurality of optical fiber-side lenses facing said optical input/output end faces of said plurality of optical fibers, said pluralities of optical waveguide-side lenses and optical fiber-side lenses provided integrally on said intervening wall of said receptacle at positions between, and in a non-contact manner relative to, said optical input/output end faces of said plurality of optical waveguides and said optical input/output end faces of said plurality of optical fibers, respectively, and configured to send and receive an optical signal between said optical input/output end faces of said plurality of optical waveguides and said optical input/output end faces of said plurality of optical fibers,
wherein said end face wall comprises a first end face facing an end face of said substrate in an optical transmission direction and positioned closer to said substrate than said optical waveguide-side lens, and a second end face facing said ferrule in said optical transmission direction and positioned closer to said ferrule than said optical fiber-side lens; and
wherein a positioning surface that comes in contact with said substrate layer is formed on said upper surface wall.

6. The optical connector system of claim 5, wherein in accordance with a traveling direction of an optical signal, one of said optical waveguide-side lens and said optical fiber-side lens acts as a collimator lens and the other acts as a condensing lens.

7. The optical connector system of claim 5, wherein a guide is formed between said receptacle and said substrate and is configured to guide said receptacle and said substrate to allow relative movement of said receptacle and said substrate in a direction parallel to an extending direction of said optical waveguides.

8. An active optical cable comprising the optical connector system of claim 5.

* * * * *